US011640720B2

(12) United States Patent
Petrova et al.

(10) Patent No.: US 11,640,720 B2
(45) Date of Patent: May 2, 2023

(54) TEXT RECOGNITION IN A VIDEO STREAM USING A COMBINATION OF RECOGNITION RESULTS WITH PER-CHARACTER WEIGHTING

(71) Applicant: Smart Engines Service, LLC, Moscow (RU)

(72) Inventors: Olga Olegovna Petrova, Moscow (RU); Konstantin Bulatovich Bulatov, Moscow (RU); Vladimir Viktorovich Arlazarov, Moscow (RU)

(73) Assignee: Smart Engines Service, LLC, Moscow (RU)

( * ) Notice: Subject to any disclaimer, the term of this patent is extended or adjusted under 35 U.S.C. 154(b) by 149 days.

(21) Appl. No.: 17/180,434

(22) Filed: Feb. 19, 2021

(65) Prior Publication Data

US 2022/0012485 A1 Jan. 13, 2022

(30) Foreign Application Priority Data

Jul. 7, 2020 (RU) ................................ 2020122443

(51) Int. Cl.
*G06V 30/10* (2022.01)
*G06V 30/41* (2022.01)
*G06V 30/413* (2022.01)

(52) U.S. Cl.
CPC ............ *G06V 30/10* (2022.01); *G06V 30/413* (2022.01)

(58) Field of Classification Search
CPC combination set(s) only.
See application file for complete search history.

(56) References Cited

U.S. PATENT DOCUMENTS

| 9,684,843 B2 * | 6/2017 | Isaev ................... G06V 30/153 |
| 2008/0252936 A1 * | 10/2008 | Stratton ............ H04N 1/00222 358/403 |
| 2022/0012484 A1 * | 1/2022 | Bulatov ............... G06V 30/413 |

OTHER PUBLICATIONS

Kaur Ravneet, "Text recognition applications for mobile devices," Journal of Global Research in Computer Science, vol. 9, No. 4, pp. 20-24, 2018.
Emma Foster, "Top Five Business Processes OCR Can Improve," https://www.cms-connected.com/News-Archive/August-2019/Top-Five-Business-Processes-OCR-Can-Improve, 2019, [Online; accessed Jan. 27, 2020].

(Continued)

*Primary Examiner* — Helen Zong
(74) *Attorney, Agent, or Firm* — Procopio, Cory, Hargreaves & Savitch

(57) ABSTRACT

Text recognition in a video stream using combined recognition results with per-character weighting. In an embodiment, for each frame in a video stream, a text-recognition result is obtained and a frame weight is calculated. The text-recognition results of the frames are combined by aligning character-recognition results and calculating a character weight for each character-recognition result. At each position in the alignment, the character-recognition results are accumulated based on the character weights and frame weights to produce an accumulated text-recognition result that represents a text field in the video stream.

17 Claims, 7 Drawing Sheets

(56) References Cited

OTHER PUBLICATIONS

Qixiang Ye and David Doermann, "Text Detection and Recognition in Imagery: A Survey," IEEE Transactions on Pattern Analysis and Machine Intelligence, vol. 37, Jun. 2015, doi:10.1109/TPAMI.2014. 2366765.3. Qixiang Ye and David Doermann, "Text Detection and Recognition in Imagery: A Survey," IEEE Transactions on Pattern Analysis and Machine Intelligence, vol. 37, Jun. 2015, doi:10.1109/ TPAMI.2014.2366765.

C. Yi and Y. Tian, "Text String Detection From Natural Scenes by Structure-Based Partition and Grouping," IEEE Transactions on Image Processing, vol. 20, No. 9, pp. 2594-2605, Sep. 2011, doi:10.1109/TIP.2011.2126586.

D. S. S. De Zoysa, J. M. Sampath, E. M. P. De Seram, D. M. I. D. Dissanayake, L. Wijerathna, and S. Thelijjagoda, "Project Bhashitha—Mobile Based Optical Character Recognition and Text-to-Speech System," in 2018 13th International Conference on Computer Science Education (ICCSE), 2018, pp. 1-5.

Hanen Jabnoun, Faouzi Benzarti, and Hamid Amiri, "A new method for text detection and recognition in indoor scene for assisting blind people," in Proc. SPIE (ICMV 2016), 2017, vol. 10341, doi:10. 1117/12.2268399.

D. V. Tropin, Y. A. Shemyakina, I. A. Konovalenko, and I. A. Faradzhev, "Localization of planar objects on the images with complex structure of projective distortion," Information Processes, vol. 19, No. 2, pp. 208-229, 2019, (In Russian).

Konstantin Bulatov, Daniil Matalov, and Vladimir Arlazarov, "MIDV-2019: challenges of the modern mobile-based document OCR," in Twelfth International Conference on Machine Vision (ICMV 2019). Jan. 2020, vol. 11433, pp. 717-722, SPIE, doi:10.1117/12.2558438.

X. Yin, Z. Zuo, S. Tian, and C. Liu, "Text Detection, Tracking and Recognition in Video: A Comprehensive Survey," IEEE Transactions on Image Processing, vol. 25, No. 6, pp. 2752-2773, Jun. 2016, doi:10.1109/TIP.2016.2554321.

Wang Baokang, Changsong Liu, and Xiaoqing Ding, "A research on Video text tracking and recognition," Proceedings of SPIE—The International Society for Optical Engineering, vol. 8664, pp. 99-108, 2013, doi:10.1117/12.2009441.

Congjie Mi, Yuan Xu, Hong Lu, and Xiangyang Xue, "A Novel Video Text Extraction Approach Based on Multiple Frames," in 5th International Conference on Information Communications Signal Processing, 2005, vol. 2005, pp. 678-682, doi: 10.1109/ICICS.2005. 1689133.

Linwei Yue, Huanfeng Shen, Jie Li, Qiangqiang Yuan, Hongyan Zhang, and Liangpei Zhang, "Image superresolution: The techniques, applications, and future," Signal Processing, vol. 128, pp. 389-408, 2016, doi:10.1016/j.sigpro.2016.05.002.

C. Liu and D. Sun, "A Bayesian approach to adaptive video super resolution," in CVPR 2011, 2011, pp. 209-216, doi:10.1109/CVPR. 2011.5995614.

Takeshi Mita and Osamu Hori, "Improvement of video text recognition by character selection," in Proceedings of Sixth International Conference on Document Analysis and Recognition, Jan. 2001, pp. 1089-1093, doi:10.1109/CDAR.2001.953954.

X. Rong, C. Yi, X. Yang, and Y. Tian, "Scene text recognition in multiple frames based on text tracking," in 2014 IEEE International Conference on Multimedia and Expo (ICME), Jul. 2014, pp. 1-6, doi:10.1109/ICME.2014.6890248.

J. Greenhalgh and M. Mirmehdi, "Recognizing Text-Based Traffic Signs," IEEE Transactions on Intelligent Transportation Systems, vol. 16, No. 3, pp. 1360-1369, Jun. 2015, doi:10.1109/TITS.2014. 2363167.

Alessandro Bissacco, Mark Cummins, Yuval Netzer, and Hartmut Neven, "PhotoOCR: Reading Text in Uncontrolled Conditions," in The IEEE International Conference on Computer Vision (ICCV), Dec. 2013, pp. 785-792.

J. G. Fiscus, "A post-processing system to yield reduced word error rates: Recognizer Output Voting Error Reduction (ROVER)," in 1997 IEEE Workshop on Automatic Speech Recognition and Understanding Proceedings, 1997, pp. 347-354, doi:10.1109/ASRU.1997. 659110.

K.B. Bulatov, "A method to reduce errors of string recognition based on combination of several recognition results with per-character alternatives," Bulletin of the South Ural State University. Ser. Mathematical Modelling, Programming & Computer Software, vol. 12, No. 3, pp. 74-88, 2019, doi:10.14529/mmp190307.

Olga Petrova, Konstantin Bulatov, and Vladimir L. Arlazarov, "Methods of weighted combination for text field recognition in a video stream," in Twelfth International Conference on Machine Vision (ICMV 2019). 2020, vol. 11433, pp. 704-709, SPIE, doi:10. 1117/12.2559378.

Vladimir Arlazarov, Konstantin Bulatov, Timofey Chernov, and V.L. Ariazarov, "MIDV-500: a dataset for identity document analysis and recognition on mobile devices in video stream," Computer Optics, vol. 43, pp. 818-824, Oct. 2019, doi:10.18287/2412-6179-2019-43-5-818-824.

Timofey Chernov, Sergey Ilyuhin, and Vladimir Arlazarov, "Application of dynamic saliency maps to the video stream recognition systems with image quality assessment," in Eleventh International Conference on Machine Vision (ICMV 2018), Mar. 2019, vol. 11041, pp. 206-213, doi:10.1117/12.2522768.

Konstantin Bulatov, Vladimir Arlazarov, Timofey Chernov, Oleg Slavin, and Dmitry Nikolaev, "Smart IDReader: Document Recognition in Video Stream," in 14th IAPR International Conference on Document Analysis and Recognition (ICDAR), Nov. 2017, pp. 39-44, doi:10.1109/ICDAR.2017.347.

L. Yujian and L. Bo, "A Normalized Levenshtein Distance Metric," IEEE Transactions on Pattern Analysis and Machine Intelligence, vol. 29, No. 6, pp. 1091-1095, 2007, doi:10.1109/TPAMI.2007. 1078.

\* cited by examiner

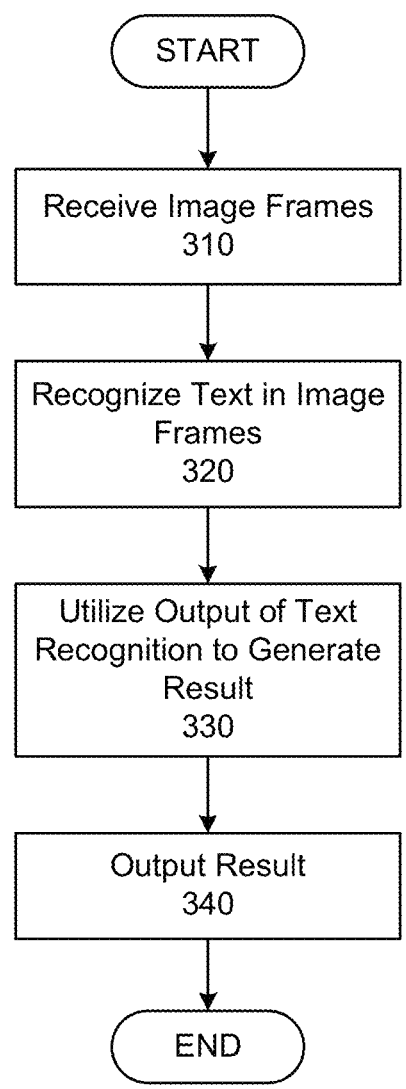

| Field image | Result | Focus score |
|---|---|---|
|  | 18 66 7414 | 0.0272 |
|  | 18 04 1014 | 0.0291 |
|  | 15 56 2014 | 0.0335 |
|  | 15-06-2014 | 0.0519 |

FIG. 4B

| Field image | Result | Focus score |
|---|---|---|
|  | 5-16-1. | 0.0507 |
|  | 15-08-2014 | 0.0803 |
|  | 18-06-2014 | 0.0531 |
|  | 15-06-2014 | 0.1711 |

TEXT RECOGNITION IN A VIDEO STREAM USING A COMBINATION OF RECOGNITION RESULTS WITH PER-CHARACTER WEIGHTING

CROSS-REFERENCE TO RELATED APPLICATIONS

This application claims priority to Russian Patent App. No. 2020122443, filed on Jul. 7, 2020, which is hereby incorporated herein by reference as if set forth in full.

BACKGROUND

Field of the Invention

The embodiments described herein are generally directed to text recognition, and, more particularly, to text recognition in a video stream using a combination of recognition results with per-character weighting.

Description of the Related Art

The usage of mobile devices to perform computer-vision tasks has become widespread. In many cases, recognition tasks must be performed in uncontrolled conditions. Examples of such conditions include, without limitation, unknown backgrounds behind the target objects to be recognized, the presence of geometric distortions to the target objects, unknown lighting, and/or the like. In practice, severe projective distortions of text fields of the target object (e.g., an identity document, bank card, or other document with printed text fields) can occur when the target object is skewed (e.g., to avoid highlights or shadows), during the recognition of two-page documents (e.g., a passport) in which the pages are positioned in different planes, and/or the like. In addition, insufficient lighting often occurs in the recognition environments for travel documents, migration control, field validation of documents, manual or automated data entry from documents, and/or the like. In such environments, capturing conditions are generally not regulated by the designer of the recognition system.

FIG. 1A illustrates an example frame of an identity document with strong projective distortions, and FIG. 1B illustrates an example frame of an identity document in low lighting conditions. Both frames were captured using the camera of a mobile device, and form part of the Mobile Identity Document Video (MIDV) 2019 dataset. The MIDV-2019 dataset is described in "MIDV-2019: Challenges of the modern mobile-based document OCR," Bulatov et al., Computer Vision and Pattern Recognition, vol. 11433, pp. 717-22, doi:10.1117/12.2558438, January 2020, which is hereby incorporated herein by reference as if set forth in full.

Thus, what is needed is the ability to accurately recognize text, even when there are projective distortions and/or low lighting conditions.

SUMMARY

Accordingly, systems, methods, and non-transitory computer-readable media are disclosed for text recognition from a document in a video stream, which may be suffering, for example, from projective distortions and/or poor lighting conditions.

In an embodiment, a method comprises using at least one hardware processor to: receive a plurality of image frames from a video of a document; for each of the plurality of image frames, perform text recognition on the image frame to obtain a text-recognition result for the image frame, wherein the text-recognition result comprises a plurality of character-recognition results, wherein each character-recognition result represents a character in a text field in the document, and calculate a frame weight for the image frame; and combine the text-recognition results for at least a subset of the plurality of image frames by aligning the character-recognition results across the text-recognition results for the at least a subset of the plurality of image frames into an alignment with a plurality of positions, wherein each of the plurality of positions represents a position of a character in the text field in the document, calculating a character weight for each character-recognition result in the text-recognition results for the at least a subset of the plurality of image frames, and, at each of the plurality of positions in the alignment, accumulating the character-recognition results that are at that position, across the text-recognition results for the at least a subset of the plurality of image frames, based on the character weights and the frame weights, to produce an accumulated text-recognition result that represents the text field in the document. The at least a subset of the plurality of image frames may consist of only a portion of the plurality of image frames. The portion may consist of no more than a top half of the plurality of image frames having highest frame weights. The at least a subset of the plurality of image frames may comprise all of the plurality of image frames.

The frame weight for each image frame may comprise an estimate of focus for that image frame. The character weight for each character-recognition result may comprise an estimate of focus for image data of the character represented by that character-recognition result. Each frame weight and each character weight may be calculated using a same focus estimation algorithm. The frame weight for each image frame may comprise a minimum estimation value across the character-recognition results in the text-recognition result for that image frame. Accumulating the character-recognition results that are at each position may comprise iterating through each of the character-recognition results at that position, wherein each iteration comprises combining a current character-recognition result with an accumulated character-recognition result.

Combining a current character-recognition result with an accumulated character-recognition result may comprise: when neither the current character-recognition result nor the accumulated character-recognition result represents an empty character, combining the current character-recognition result with the accumulated character-recognition result, based on a weight calculated for the accumulated character-recognition result and the character weight for the current character-recognition result; when the current character-recognition result represents an empty character, combining the current character-recognition result with the accumulated character-recognition result, based on the weight calculated for the accumulated character-recognition result and a weight calculated for the text-recognition result that comprises the current character-recognition result; and, when the accumulated character-recognition result represents an empty character, combining the current character-recognition result with the accumulated character-recognition result, based on a sum of weights calculated for the text-recognition results that comprise all previously considered character-recognition results and the character weight for the current character-recognition result. The weights calculated for the text-recognition results may comprise an estimate of focus for image data of the text field in the document. The frame weight for each image frame may comprise an estimate of focus for that image frame, wherein the character weight for each character-recognition result comprises an estimate of focus for image data of the character represented by that character-recognition result, and wherein each frame weight, each character weight, and each of the weights calculated for the text-recognition results are calculated using a same focus estimation algorithm.

The method may further comprise deriving a character string based on the accumulated text-recognition result. The method may further comprise using the character string in at least one query. The document may be an identity document, wherein the character string represents identity data, and wherein the method comprises using the character string in at least one query to verify or record the identity data.

The method may be embodied in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 3 illustrates a process in which text recognition may be performed, according to an embodiment;

FIGS. 4A and 4B illustrate sample text-recognition results, according to an embodiment;

DETAILED DESCRIPTION

In an embodiment, systems, methods, and non-transitory computer-readable media are disclosed for text recognition from a document in a video stream, which may be suffering, for example, from projective distortions and/or poor lighting conditions. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. System Overview

1.1. Example Processing Device

Figure 1B:
FIGS. 1A and 1B illustrate example video frames with strong projective distortions and low lighting conditions, respectively.
Figure 1A:
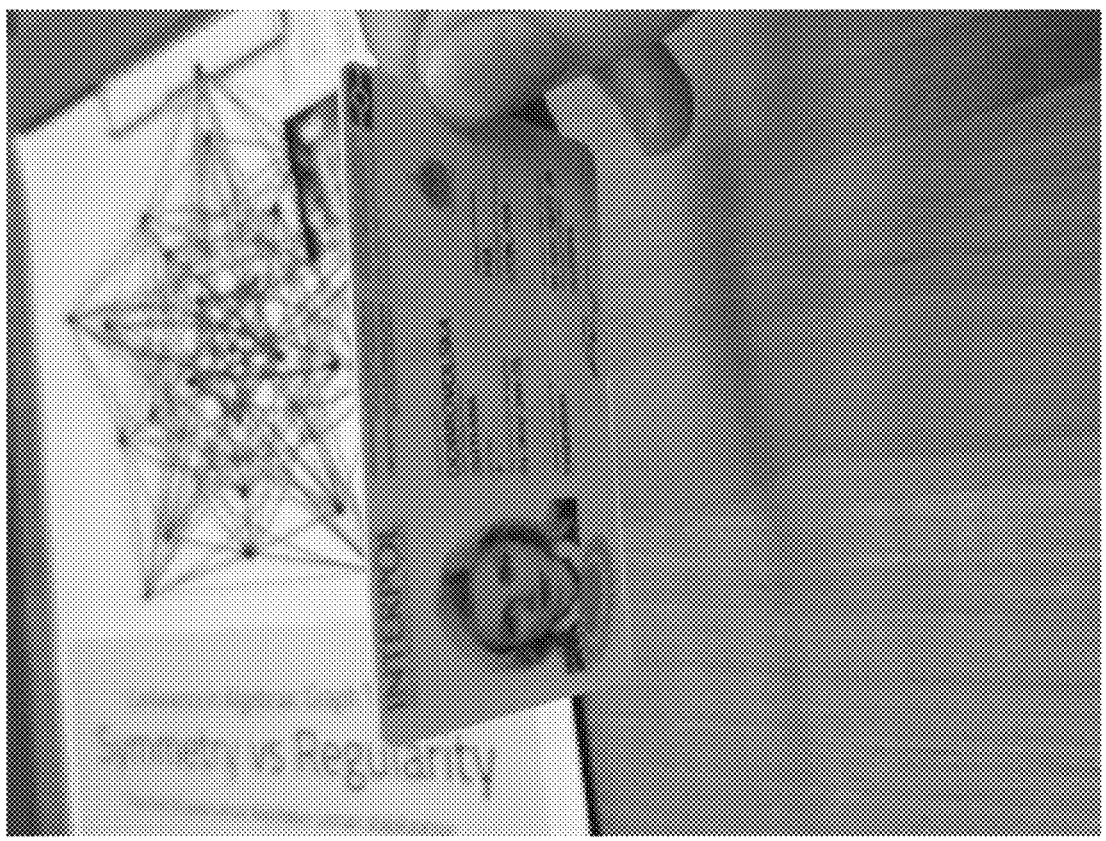
Figure 2:
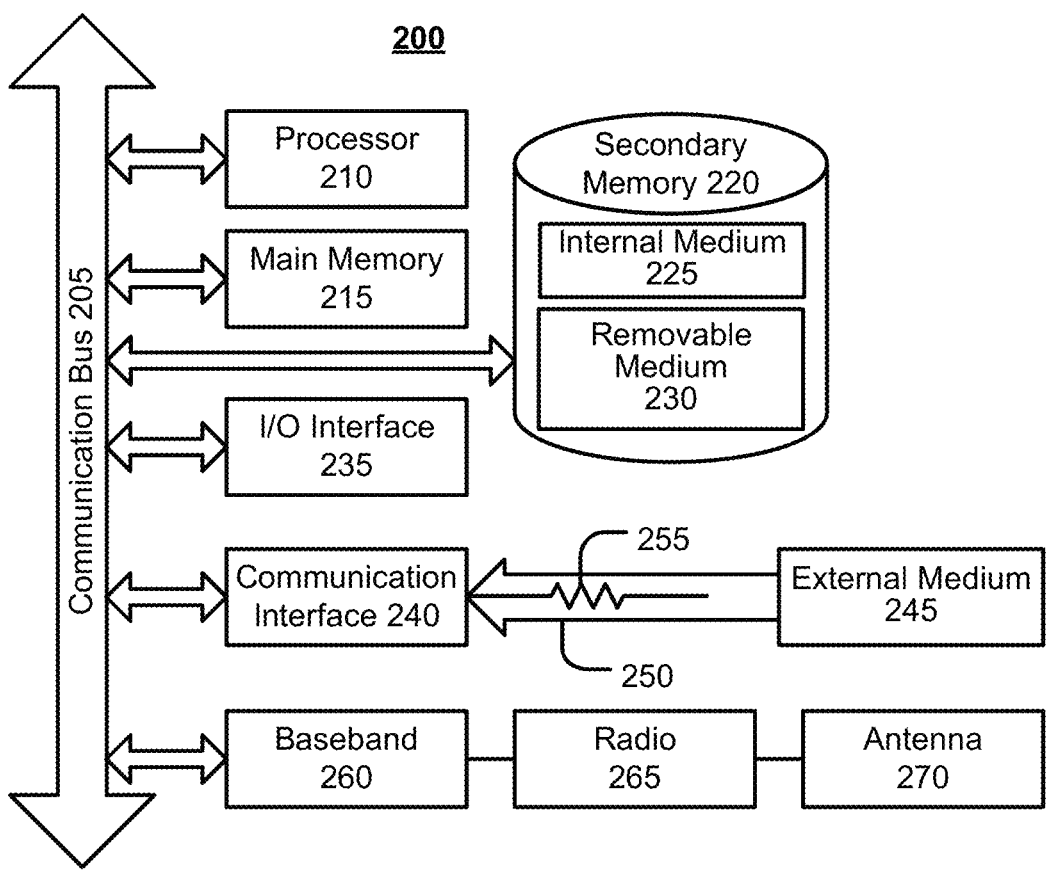
FIG. 2 illustrates an example processing system, by which one or more of the processes described herein, may be executed, according to an embodiment.

FIG. 2 is a block diagram illustrating an example wired or wireless system 200 that may be used in connection with various embodiments described herein. For example, system 200 may be used as or in conjunction with one or more of the functions, processes, or methods (e.g., to store and/or execute the application, the disclosed text-recognition module, or one or more other software modules of the application) described herein. System 200 can be a server, mobile device (e.g., smartphone, tablet computer, laptop computer, etc.), any conventional personal computer, or any other processor-enabled device that is capable of wired or wireless data communication. Other computer systems and/or architectures may be also used, as will be clear to those skilled in the art.

System 200 preferably includes one or more processors, such as processor 210. Additional processors may be provided, such as an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, the Pentium® processor, Core i7® processor, and Xeon® processor, all of which are available from Intel Corporation of Santa Clara, Calif.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPM), IEEE 696/S-100, and/or the like.

System 200 preferably includes a main memory 215 and may also include a secondary memory 220. Main memory 215 provides storage of instructions and data for programs executing on processor 210, such as one or more of the functions and/or modules discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD)

drive, a digital versatile disc (DVD) drive, other optical drive, a flash memory drive, and/or the like.

Secondary memory 220 is a non-transitory computer-readable medium having computer-executable code (e.g., disclosed software modules) and/or other data stored thereon. The computer software or data stored on secondary memory 220 is read into main memory 215 for execution by processor 210.

In alternative embodiments, secondary memory 220 may include other similar means for allowing computer programs or other data or instructions to be loaded into system 200. Such means may include, for example, a communication interface 240, which allows software and data to be transferred from external storage medium 245 to system 200. Examples of external storage medium 245 may include an external hard disk drive, an external optical drive, an external magneto-optical drive, and/or the like. Other examples of secondary memory 220 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 120) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network, or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed application, or software modules) is stored in main memory 215 and/or secondary memory 220. Computer programs can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225, removable medium 230, and external storage medium 245), and any peripheral device communicatively coupled with communication interface 240 (including a network information server or other network device). These non-transitory computer-readable media are means for providing executable code, programming instructions, software, and/or other data to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

In an embodiment, I/O interface 235 provides an interface between one or more components of system 200 and one or more input and/or output devices. Example input devices include, without limitation, sensors, keyboards, touch screens or other touch-sensitive devices, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

In an embodiment, I/O interface 235 provides an interface to a camera (not shown). for example, system 200 may be a mobile device, such as a smartphone, tablet computer, or laptop computer, with one or more integrated cameras (e.g., rear and front facing cameras). Alternatively, system 200 may be a desktop or other computing device that is connected via I/O interface 235 to an external camera. In either case, the camera captures images (e.g., photographs, video, etc.) for processing by processor(s) 210 (e.g., executing the disclosed software) and/or storage in main memory 215 and/or secondary memory 220.

System 200 may also include optional wireless communication components that facilitate wireless communication over a voice network and/or a data network (e.g., in the case of a mobile device). The wireless communication components comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also encodes the digital signals for transmission and generates a baseband transmit audio signal that is routed to the modulator portion of radio system 265. The modulator mixes the baseband transmit audio signal with an RF carrier signal, generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor 210, which may be a central processing unit (CPU). Processor 210 has access to data storage areas 215 and 220. Processor 210 is preferably configured to execute instructions (i.e., computer programs, such as the disclosed application, or software modules) that can be stored in main memory 215 or secondary memory 220. Computer programs can also be received from baseband processor 260 and stored in main memory 210 or in secondary memory 220, or executed upon receipt. Such computer programs, when executed, enable system 200 to perform the various functions of the disclosed embodiments.

1.2. Example System

The disclosed method of text recognition may be implemented as a stand-alone software application or as a text-recognition module within a larger software application. The application may be fully hosted and executed on a user system, such as a mobile device (e.g., smartphone, tablet computer, laptop computer, etc.) or desktop computer, or fully hosted and executed on a server system (e.g., a web server that provides a website or web service). Alternatively, the application may be a distributed application, with one or more functions hosted and executed as one or more software modules on a user system and one or more other functions hosted and executed as one or more software modules on a server system. In this case, the text-recognition module of the application may be performed client-side on the user system, server-side on the server system, or may itself be distributed with one or more of its functions performed by the user system and one or more other functions performed by the server system.

In an embodiment, in which the text recognition is performed as part of a larger software application, the text-recognition module may receive an input from one module of the application and provide an output to another module of the application. For example, the text-recognition module may receive an image of a document as the input, and provide text, extracted from the image of the document, as the output. The application may then utilize the provided text to perform some other function, such as an identity search or verification in the case that the document is an identity document, a check deposit in the case that the document is a check, general data entry, and/or the like.

2. Process Overview

Embodiments of processes for text recognition in a video stream, using a combination of recognition results with per-character weighting, will now be described in detail. It should be understood that the described processes may be embodied in one or more software modules that are executed by one or more hardware processors, client-side, server-side, or distributed across both a user system and a server system. The described processes may be implemented as instructions represented in source code, object code, and/or machine code. These instructions may be executed directly by hardware processor(s) 210, or alternatively, may be executed by a virtual machine operating between the object code and hardware processors 210. In addition, the disclosed application may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, are illustrated with a certain arrangement and ordering of steps or subprocesses, each process may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

2.1. Overall Process

FIG. 3 illustrates a process 300 in which text recognition may be performed, according to an embodiment. Process 300 may be performed by a user system or a server system. Alternatively, process 300 may be a distributed process with some subprocesses, such as subprocesses 310 and 320, being performed client-side by a user system and other subprocesses, such as subprocesses 330 and 340, being performed server-side by a server system. It should be understood that subprocess 320 represents the disclosed text-recognition module, which may form part of a larger application that implements process 300. Alternatively, the text-recognition module may implement subprocess 320 as a stand-alone process by itself or in combination with subprocess 310.

In subprocess 310, image frames from a video stream are received. Subprocess 310 may comprise capturing a video of a document using a digital camera (e.g., a small-scale digital camera integrated into or connected to a mobile device). Alternatively, subprocess 310 may comprise simply receiving the video of a document or image frames extracted from the video of a document. In the case that a digital camera is used, the image frames of the document will typically exhibit at least some—and potentially, severe—projective distortions, and will generally have been captured under non-uniform—and potentially, low—lighting conditions.

In subprocess 320, the text-recognition module processes images of text, represented in the image frames, to recognize text in the document. During subprocess 320, the image frames may also be pre-processed and/or post-processed. For example, the image frames may be cropped to isolate text field(s) in the image frames, and the text recognition may only be performed on the cropped images of the isolated text field(s). Subprocess 320 may recognize text in the image frames in real time or near-real time as the video is being captured (e.g., in parallel with subprocess 310), or may recognize text in the image frames after the video has been captured (e.g., after subprocess 310 is complete).

In subprocess 330, the output of the text recognition in subprocess 320 may be utilized in one or more additional subprocesses to produce a result that is output in subprocess 340. For example, subprocess 330 may utilize the recognized text to perform functions such as an identity search or verification, financial transaction (e.g., check deposit), general data entry, and/or any other function for which Optical Character Recognition (OCR) is used.

2.2. Text Recognition

An embodiment of the text-recognition module, used in subprocess 320, will now be described in detail. The text-recognition module will primarily be described with respect to its improvement over prior methods. It should be understood that any functions of text recognition that are not specifically described herein may utilize any standard or non-standard implementation that is known in the art.

In general, the accuracy of text recognition will suffer significantly when text fields of a document in an image are of poor image quality, as discussed, for example, in "MIDV-2019: challenges of the modern mobile-based document OCR," Bulatov et al., 12th Int'l Conference on Machine Vision, vol. 11433, pp. 717-22, doi:10.1117/12.2558438, January 2020, which is hereby incorporated herein by reference as if set forth in full. Poor image quality of text fields may result from distortions, highlights, blur, low resolution, low lighting conditions, and/or the like. One method for increasing text-recognition accuracy in such cases is to use multiple image frames from a video of the document. Not only does the combination of information from multiple image frames improve text recognition, but detection of the text fields themselves can also be improved by accounting for special and temporal characteristics in the multiple image frames. This is described, for example, in "Text Detection, Tracking and Recognition in Video: A Comprehensive Survey," IEEE Transactions on Image Processing, vol. 25, no. 6, pp. 2752-73, doi:10.1109/TIP.2016.2554321, June 2016, which is hereby incorporated herein by reference as if set forth in full.

Methods for combining per-frame information from multiple image frames of a video may be divided into two general groups. The first group encompasses image-level methods that rely on image combination in order to obtain a higher quality object representation. These image-level methods comprise selection and filtering of the most informative image regions (see, e.g., "A research on Video text tracking and recognition," Baokang et al., Proceedings of the SPIE—The Int'l Society for Optical Eng'g, vol. 8664, pp. 99-108, doi:10.1117/12.2009441, 2013, which is hereby incorporated herein by reference as if set forth in full), increasing the precision of text segmentation using multiple input images (see, e.g., "A Novel Video Text Extraction Approach Based on Multiple Frames," Congjie et al., 5th Int'l Conference on Information Communications Signal Processing, vol. 2005, pp. 678-82, doi:10.1109/ICICS.2005.1689133, 2005, which is hereby incorporated herein by reference as if set forth in full), or super-resolution approaches (see, e.g., "Image super-resolution: The techniques, applications, and future," Yue et al., Signal Processing, vol. 128, pp. 389-408, doi:10.1016/j.sigpro.2016.05.002, 2016, and "A Bayesian approach to adaptive video super resolution," Liu et al., CVPR 2011, pp. 209-16, doi:10.1109/CVPR.2011.5995614, 2011, which are both hereby incorporated herein by reference as if set forth in full).

The second group encompasses result-level methods that combine text-recognition results performed on extracted text. These result-level methods may be regarded as variants of classifier ensembles, but which utilize the same recognition model for different images of the same object, rather than different recognition models for a single image of the object. These methods include per-character selection of the best recognition result (see, e.g., "Improvement of video text recognition by character selection," Mita et al., Proceedings in Sixth Int'l Conference on Document Analysis and Recognition, pp. 1089-93, doi:10.1109/ICDAR.2001.953954, January 2001, which is hereby incorporated herein by reference as if set forth in full), voting and condition random field models (see, e.g., "Scene text recognition in multiple frames based on text tracking," Rong et al., 2014 IEEE Int'l Conference on Multimedia and Expo, pp. 1-6, doi:10.1109/ICME.2014.6890248, July 2014, which is hereby incorporated herein by reference as if set forth in full), frequency-based combination (see, e.g., "Recognizing Text-Based Traffic Signs," Greenhalgh et al., IEEE Transactions on Intelligent Transportation Systems, vol. 16, no. 3, pp. 1360-69, doi:10.1109/TITS.2014.2363167, June 2015, which is hereby incorporated herein by reference as if set forth in full), and others.

When combining per-frame text recognition results, a preliminary character alignment should generally be performed, as described, for example, in "PhotoOCR: Reading Text in Uncontrolled Conditions," Bissacco et al., IEEE Int'l Conference on Computer Vision, pp. 785-92, December 2013, which is hereby incorporated herein by reference as if set forth in full. This is due to per-character segmentation errors caused by image defects, such as blur, low resolution, partial obstruction of text fields due to highlights, and/or the like. As described in "A post-processing system to yield reduced word error rates: Recognizer Output Voting Error Reduction (ROVER)," Fiscus, 1997 IEEE Workshop on Automatic Speech Recognition and Understanding Proceedings, pp. 347-54, doi:10.1109/ASRU.1997.659110, 1997, which is hereby incorporated herein by reference as if set forth in full, ROVER employs a two-staged approach that involves preliminary alignment with minimization of edit distance, and a subsequent voting procedure to select the best character in each aligned group. This two-staged approach can be generalized for the case in which the character-recognition result is represented as a distribution of class membership estimations, rather than a single class label. See, e.g., "A method to reduce errors of string recognition based on combination of several recognition results with per-character alternatives," Bulatov, Bulletin of the South Ural State University, Ser. Mathematical Modelling, Programming & Computer Software, vol. 12, no. 3, pp. 74-88, doi:10.14529/mmp190307, 2019, which is hereby incorporated herein by reference as if set forth in full.

Recognition results that are obtained using low-quality image frames may corrupt the total combined result. Thus, it is useful to apply a weighting strategy to assign a weight or score to each component result in the combined result. "Methods of weighted combination for text field recognition in a video stream," Petrova et al., 12th Int'l Conference on Machine Vision, vol. 11433, pp. 704-9, SPIE, doi:10.1117/12.2559378, 2020, which is hereby incorporated herein by reference as if set forth in full, evaluated weighting strategies on the open MIDV-500 dataset, which comprises video clips of identity documents that were captured using mobile devices. The MIDV-500 dataset is described in "MIDV-500: a dataset for identity document analysis and recognition on mobile devices in video stream," Arlazarov et al., Computer Optics, vol. 43, pp. 818-24, doi:10.18287/2412-6179-2019-43-5-818-824, October 2019, which is hereby incorporated herein by reference as if set forth in full. Experimental results in Petrova et al. demonstrated that a weighted combination of 50% of the highest-scored image frames, with focus estimation scores used as the weights, achieves lower error rates compared to unweighted combinations. However, despite the MIDV-500 dataset containing various backgrounds, against which the documents have been captured, it has relatively low variance in geometric distortions and lighting conditions.

To implement the disclosed text-recognition module, weighted combination strategies were evaluated for text fields that were extracted from documents captured with high projective distortions and in poor lighting conditions. Specifically, video clips in the MIDV-2019 dataset were used. Then, the algorithm of the chosen weighted combination strategy was modified to introduce per-character weighting.

In the weighted combination model of Petrova et al., frame weights $w(l_i(c), x_i)$, reflecting the quality of each recognition result from each image frame, are calculated from the input image frame $l_i(x)$ and/or the text-recognition results $x_i$ of the input image frame. Then, the image frames and their corresponding recognition results are ordered according to the calculated frame weights. Thus, a permutation $\pi \in S_N$ is obtained, such that $\pi(i) < \pi(j) \Leftrightarrow w(l_i(x), x_i) \geq w(l_j(x), x_j)$. A threshold parameter t is selected for the number of samples which are to be used in the combination. Thus, the final weighted combination model can be defined as follows:

$$w_i^{(t)} = \begin{cases} w(l_i(x), x_i), & \text{if } \pi(i) \leq t, \\ 0, & \text{if } \pi(i) > t \end{cases}$$

Petrova et al. evaluated two metrics as frame weights. The first metric was a focus estimation of an input image frame, calculated as a minimum 0.95-quantile of vertical, horizontal, and diagonal image gradients, as described in "Application of dynamic saliency maps to the video stream recognition systems with image quality assessment," Chernov et al., 11th Int'l Conference on Machine Vision, vol. 11041, pp. 206-13, doi:10.1117/12.2522768, March 2019, which is hereby incorporated herein by reference as if set forth in full. The second metric was the minimum value of the highest membership estimation across all string character classification results.

FIGS. 4A and 4B illustrate cropped images of sample text fields, with their text-recognition results, and corresponding frame weights calculated according to focus estimation. The examples in the table in FIG. 4A were obtained from image frames in a video with projective distortions, whereas the examples in the table in FIG. 4B were obtained from image frames in a video with low lighting conditions. Both videos were obtained from the MIDV-2019 dataset.

Calculating a global weight, such as focus estimation, on the entire field of an input image frame $l_i$ (x) may lead to a combination with a heavy weight on text field characters that are locally out of focus. At the same time, the per-character combination procedure in the text field combination algorithm of Bulatov may be modified, such that each character is associated with its own weight. Accordingly, in an embodiment, the combination algorithm in Bulatov is modified as follows:

Before the combination result is calculated, a weight $w(x_{ik})$ is assigned to each character $x_{ik}$ in the text-recognition result for each input image frame, and a weight $w(x_i)$ is assigned to the full text-recognition result for each input image frame.

Each character component $r_j$ of the currently accumulated combination result R stores its total accumulated per-character weight $W(r_j)$, which is updated after processing the text-recognition result for each input image frame.

After alignment of the accumulated result R with each input image frame result $x_i$, the algorithm attempts to match each character in one result to a character in the other result. Matched pairs of characters are combined with each other, whereas unmatched characters are combined with an empty character $\hat{\lambda}$.

When combining a character component $r_j$ of the accumulated combination result with a character $x_{ik}$ in a text-recognition result of an input image frame, their weights to be combined are $W(r_j)$ and $w(x_{ij})$, respectively.

When combining a character component $r_j$ of the accumulated combination result with an empty character $\hat{\lambda}$ (i.e., in a case in which no character in the text-recognition result is aligned with $r_j$), their combination weights are $W(r_j)$ and $w(x_i)$, respectively, wherein $w(x_i)$ is the weight for the full input image frame.

When combining an empty character $\hat{\lambda}$ with a character $x_{ij}$ in a text-recognition result of an input image frame (i.e., in a case in which no character in the accumulated combination result is aligned with $x_{ik}$), their combination weights are $\Sigma_{j=1}^{i-1} w(x_j)$ and $w(x_{ik})$, respectively, wherein $\Sigma_{j=1}^{i-1} w(x_j)$ is the sum of the weights for all previously accumulated input image frames.

Notably, it should never be the case that the character component $r_j$ and the character $x_{ij}$ in a text-recognition result of an input image frame are both empty, since there is no reason to have empty characters in result R or the text-recognition result of an input image frame. In other words, all characters in R and the text-recognition result of an input image frame are non-empty. Empty characters are not actually a component of any result, but simply a placeholder that is used when the results cannot be precisely aligned.

Figure 5:
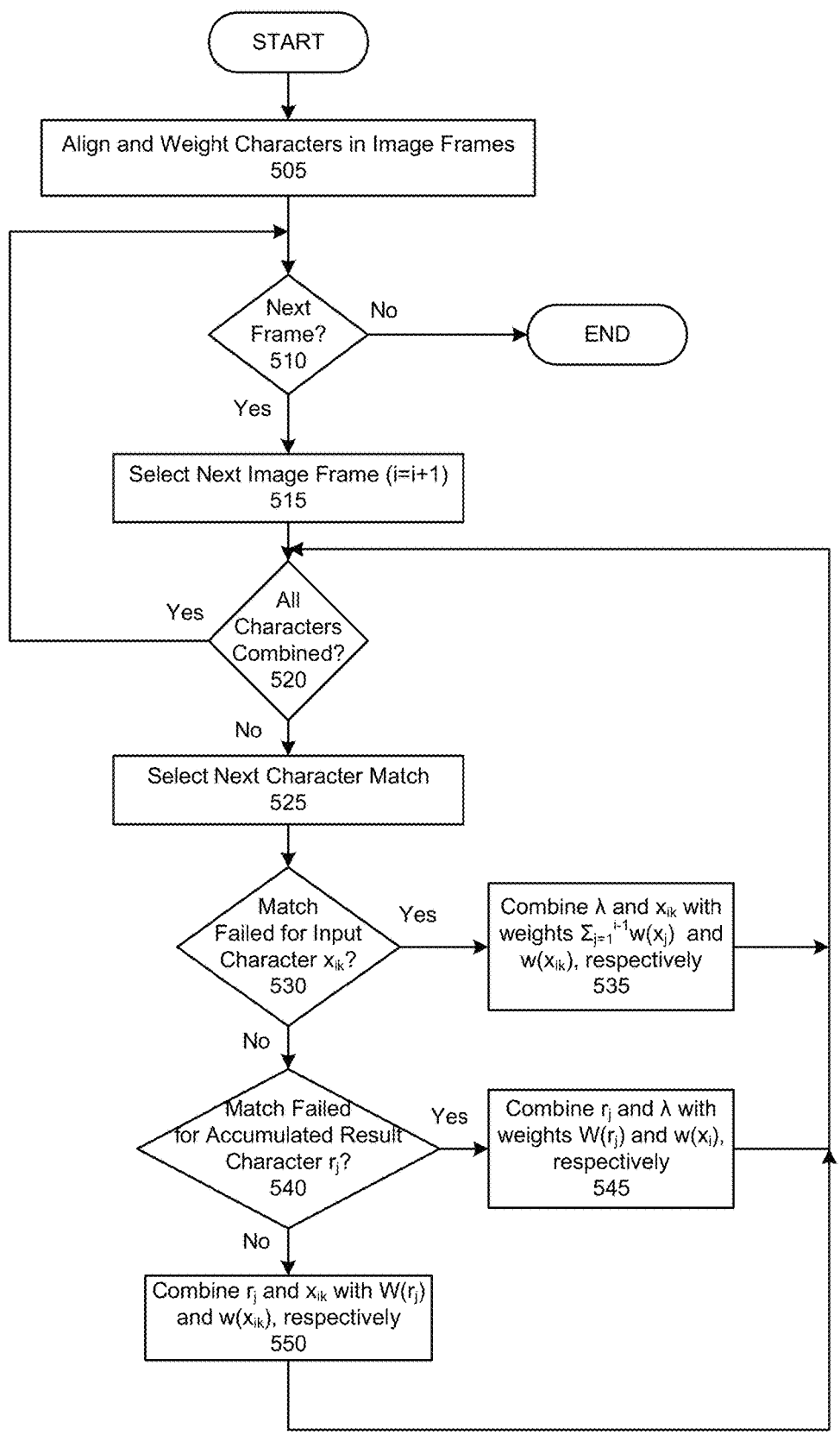
FIG. 5 illustrates a combination algorithm for text recognition, according to an embodiment.

FIG. 5 illustrates the modified combination algorithm discussed above, according to an embodiment. It should be understood that process 500 may form a portion of subprocess 320 in process 300, illustrated in FIG. 3, and may be implemented by the disclosed text-recognition module. Notably, the modified combination algorithm above can be implemented without increasing the computational complexity of the original combination algorithm.

Initially, in subprocess 505, the characters, recognized in each image frame of a video (e.g., received in subprocess 310), may be aligned across all of the image frames. This alignment may be performed by minimizing an edit distance, as discussed, for example, in Bissacco and Fiscus. In addition, a weight $w(x_{ik})$ may be assigned to each character $x_{ik}$, and a weight $w(x_i)$ may be assigned to the text-recognition result $x_i$ for the input frame. The weights may be calculated using any metric, including the focus estimation metric described herein. For instance, a focus metric may be applied to each character in each image frame. However, it should be understood that other metrics may be used for the weighting.

In any case, a text-recognition result may comprise a vector representing a plurality of character-recognition results, at each position in the alignment. Each character-recognition result may itself be represented by a vector of class membership estimations (e.g., representing the probabilities that a character at the given alignment position belongs to each of a plurality of classes). Process 500 generates an accumulated text-recognition result from individual text-recognition results for the plurality of image frames using the modified combination algorithm with per-character weightings.

If no text-recognition results for any image frames remain to be considered (i.e., "No" in subprocess 510), process 500 may end. On the other hand, if a text-recognition result from at least one image frame remain to be considered (i.e., "Yes" in subprocess 510), the text-recognition result for the next image frame is selected in subprocess 515, for example, by incrementing variable i which represents the current image frame or text-recognition result under consideration.

If all character-recognition results were combined and incorporated in the updated accumulated text-recognition result (i.e., "Yes" in subprocess 520), process 500 may return to subprocess 510 to either select the text-recognition result of the next image frame or end process 500. On the other hand, if at least one match between the text-recognition result of the current image frame and the accumulated text-recognition result remains to be considered (i.e., "No" in subprocess 520), the next character-recognition result match is selected in subprocess 525.

In the illustrated embodiment, the manner in which each character-recognition result is combined with the accumulated character-recognition result for each alignment position, in the overall accumulated text-recognition result, depends on whether the character-recognition result from the text-recognition result of the image frame and a character-recognition result in the accumulated text-recognition result matched with each other, or were left unmatched by the alignment.

If the character-recognition result of the input frame text-recognition result was not matched with any character-recognition result of the accumulated text-recognition result (i.e., "Yes" in subprocess 530), the accumulated character-recognition result is formed by combining an empty character and the considered character-recognition result using weights $\Sigma_{j=1}^{i-1} w(x_j)$ and $w(x_{ij})$, respectively, in subprocess 535. Otherwise (i.e., "No" in subprocess 530), if the considered accumulated character-recognition result was not matched with any character-recognition result in the text-recognition result of the image frame (i.e., "Yes" in subprocess 540), the accumulated character-recognition result is updated by combining the accumulated character-recognition result with an empty character using weights $W(r_j)$ and $w(x_i)$, respectively, in subprocess 545. Otherwise (i.e., "No" in subprocess 540), the accumulated character-recognition result is combined with the matched character-recognition result in the text-recognition result of the image frame using weights $W(r_j)$ and $w(x_{ik})$, respectively, in subprocess 550. In all cases, process 500 returns to subprocess 520 to determine whether there is another aligned character match to be considered.

3. Experimental Evaluation

The modified combination algorithm was compared with the original combination algorithm. A field image focus score was used as a base weighting function for input results, and a character image focus score was used as a separate character weighting function. The experiments were conducted on the MIDV-2019 dataset, which contains 200 video sequences of identity documents captured in low lighting conditions and/or with strong projective distortions. Each video sequence comprised thirty image frames. The experimental setup was the same as used in Petrova et al. Only image frames in which the identity document was fully visible were considered, and, if the resulting video length had fewer than thirty image frames, the image frames were repeated in a loop to produce a thirty-frame video clip. Text fields were cropped before the text recognition was performed, using the ground truth of document boundaries that was provided with the MIDV-2019 dataset. The experimental setup assumed ideal geometric preprocessing. Four field groups were evaluated: numeric dates; document numbers; Latin name components; and machine-readable zone lines. Each text-field recognition result was obtained using a field recognition subsystem of a Smart IDReader document recognition system, as described in "Smart IDReader: Document Recognition in Video Stream," Bulatov et al., 14th IAPR Int'l Conference on Document Analysis and Recognition, pp. 39-44, doi:1109/ICDAR.2017.347, November 2017, which is hereby incorporated herein by reference as if set forth in full. A Normalized Generalized Levenshtein Distance, as described in "A Normalized Levenshtein Distance Metric," Yujian et al., IEEE Transactions on Pattern Analysis and Machine Intelligence, vol. 29, no. 6, pp. 1091-5, doi:10.1109/TPAMI.2007.1078, 2007, which is hereby incorporated herein by reference as if set forth in full, was used as the metric function on the text-field recognition results. The comparison with correct text-field values was case-insensitive, and the letter "O" was treated as identical to the digit "0".

Since using a focus estimation as the frame weight produced the best results in Petrova et al., the focus estimation was used as the base weighting function. N and N/2 were used as values of threshold parameter t, wherein N is the number of combined results. A threshold parameter t that is equal to N corresponds to a weighted combination of all input image frames whereas a threshold parameter t that is equal to N/2 corresponds to a weighted combination of the top 50% of the input image frames. A combination algorithm that weighted full results was compared to the modified combination algorithm with per-character weighting. In addition, a combination algorithm that did not use any weighting was used as a baseline for comparison.

Figures 6A, 6B:
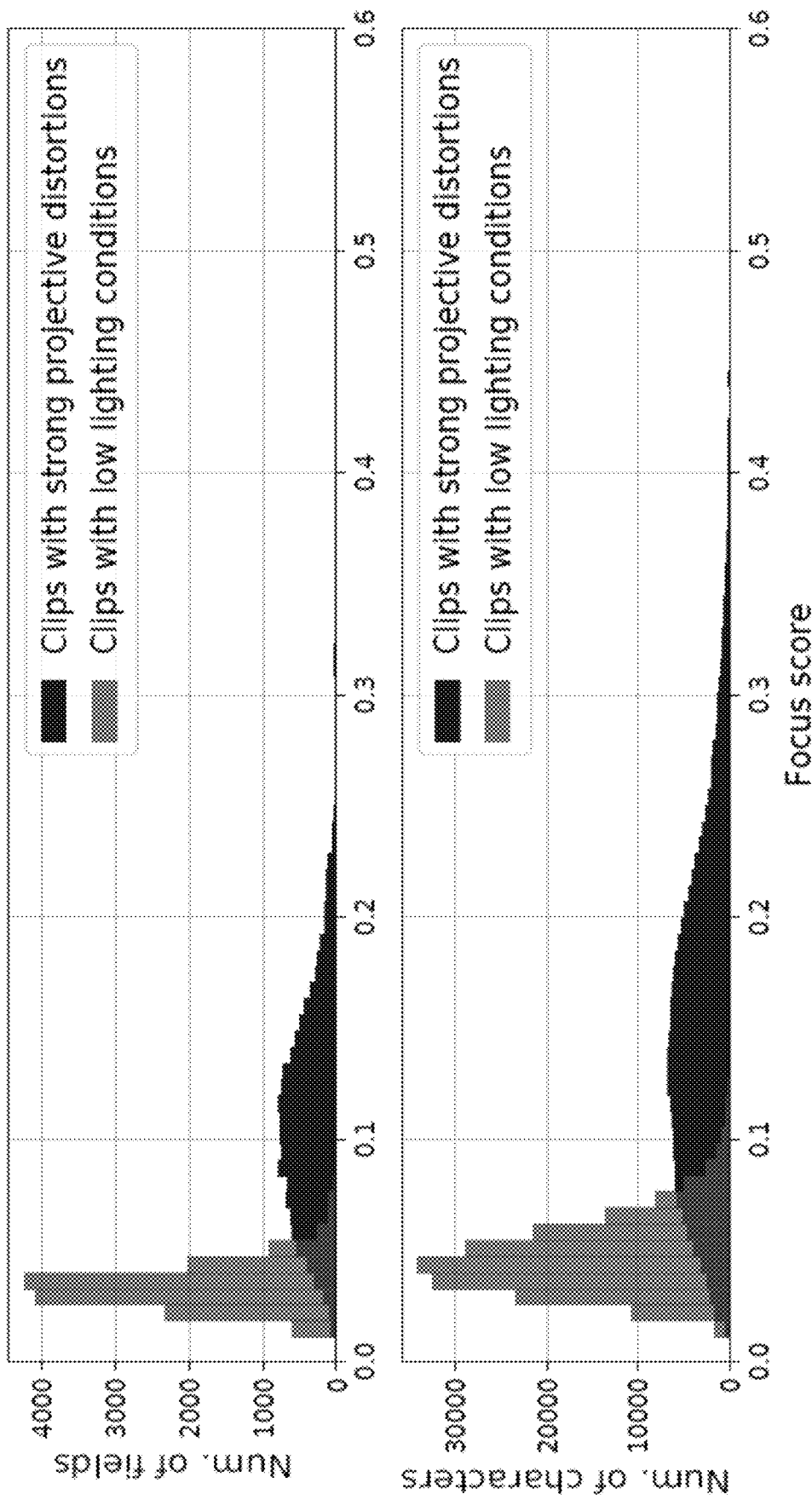
FIGS. 6A and 6B illustrate distributions of focus score estimations, according to an embodiment.

FIG. 6A illustrates the distribution of focus score estimations for images of text fields, and FIG. 6B illustrates the distribution of focus score estimations for images of separate characters. Both graphs illustrate the distribution of focus score estimations for each capturing condition (i.e., strong projective distortions and low lighting conditions). As illustrated, for video clips with strong projective distortions, but normal lighting conditions, the variance of the per-character focus scores (FIG. 6B) is noticeably higher than that of the per-field focus scores (FIG. 6A). For video clips with low lighting conditions, the distributions did not differ significantly between the per-character and per-field focus scores.

Figure 7A:
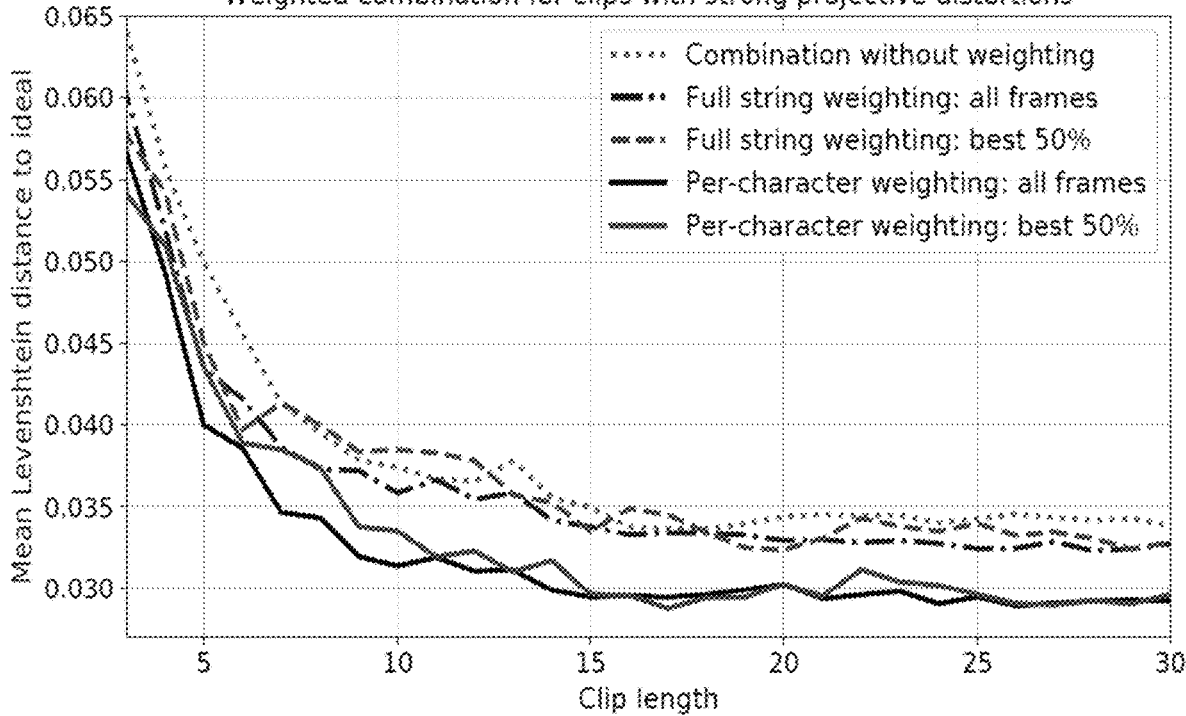
FIGS. 7A and 7B illustrate performance profiles of evaluation algorithms, according to an embodiment.

FIG. 7A illustrates the performance profiles of the evaluated combination algorithms for video clips with strong projective distortions. The performance profiles indicate that the error level of the combined result depends on the number of combined frame results. Table 1 below illustrates the mean distance metric (e.g., Levenshtein metric in this example) to the correct result for video clips with strong projective distortions, for different numbers of combined frame results using the evaluated combination algorithms. These values demonstrate that full-string weighting strategies yield roughly the same accuracy levels in combination results, with a negligible difference from the unweighted combination algorithm. However, the per-character weighting produces noticeable lower error levels.

TABLE 1 mean Levenshtein metric to the correct result
for clips with strong projective distortions

|  | Number of Frames | | | | | |
| --- | --- | --- | --- | --- | --- | --- |
|  | 5 | 10 | 15 | 20 | 25 | 30 |
| no weighting | 0.0500 | 0.0374 | 0.0350 | 0.0344 | 0.0343 | 0.0338 |
| full-string weighting: all frames | 0.0434 | 0.0359 | 0.0338 | 0.0329 | 0.0324 | 0.0327 |
| full-string weighting: best 50% | 0.0450 | 0.0385 | 0.0335 | 0.0324 | 0.0340 | 0.0328 |
| per-character weighting: all frames | 0.0400 | 0.0314 | 0.0295 | 0.0302 | 0.0295 | 0.0292 |
| per-character weighting: best 50% | 0.0435 | 0.0335 | 0.0296 | 0.0303 | 0.0296 | 0.0296 |

Figure 7B:
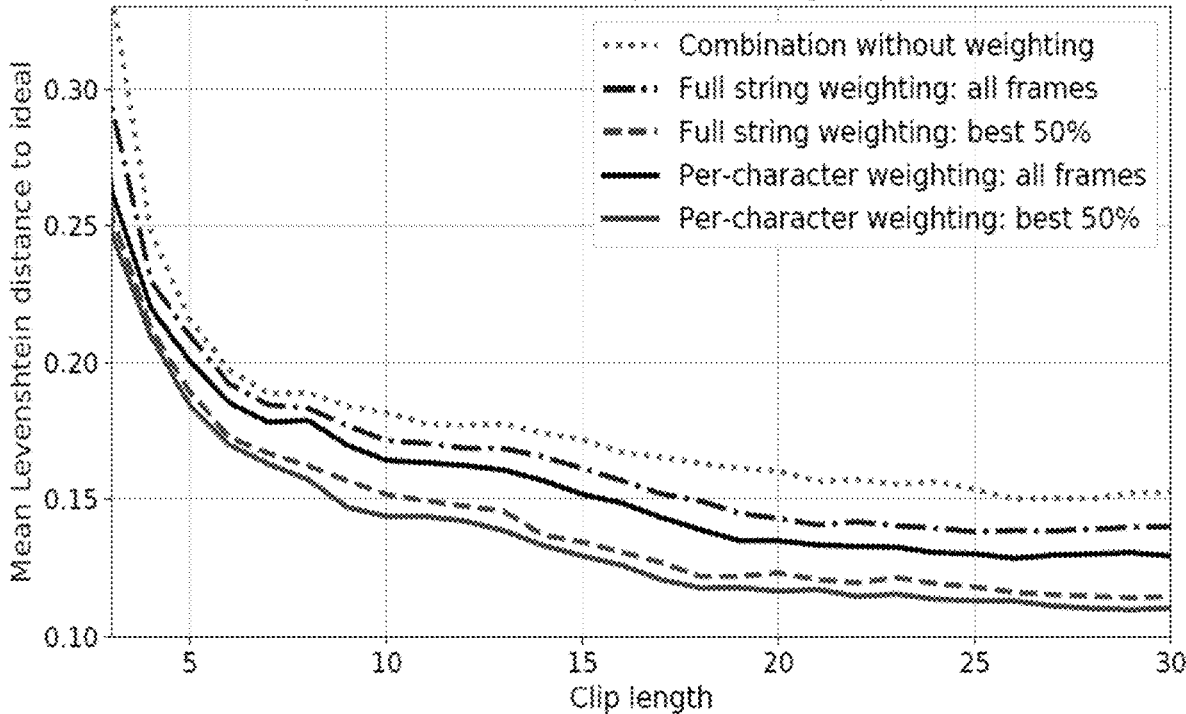

A different picture can be observed for video clips captured in low lighting conditions. Specifically, FIG. 7B illustrates the performance profiled of the evaluated combination algorithms for video clips with low lighting conditions. Table 2 below illustrates the mean distance metric (e.g., Levenshtein metric in this example) to the correct result for video clips with low lighting conditions, for different numbers of combined frame results using the evaluated combination algorithms. Regardless of the length of video clip, the use of a weighted combination algorithm improves the accuracy levels of combination results. Similarly to the results obtained on video clips from the MIDV-500 dataset, the best combination strategy is a weighted combination of the top 50% of the input image frames. At the same time, the per-character weighting yields better results with both a weighted combination of all input image frames and a weighted combination of the top 50% of input image frames.

TABLE 2 mean Levenshtein metric to the correct result
for clips with low lighting conditions

|  | Number of Frames | | | | | |
| --- | --- | --- | --- | --- | --- | --- |
|  | 5 | 10 | 15 | 20 | 25 | 30 |
| no weighting | 0.2159 | 0.1816 | 0.1716 | 0.1603 | 0.1535 | 0.1524 |
| full-string weighting: all frames | 0.2098 | 0.1713 | 0.1612 | 0.1430 | 0.1382 | 0.1400 |
| full-string weighting: best 50% | 0.1893 | 0.1517 | 0.1344 | 0.1231 | 0.1180 | 0.1145 |
| per-character weighting: all frames | 0.2006 | 0.1641 | 0.1517 | 0.1349 | 0.1301 | 0.1293 |
| per-character weighting: best 50% | 0.1842 | 0.1437 | 0.1293 | 0.1165 | 0.1131 | 0.1104 |

Based on the performance results, the modified combination algorithm, which introduces per-character weighting, based on focus score estimations, produces higher accuracy in combination results for both video clips with strong projective distortions and video clips with low lighting conditions.

4. Example Embodiment

In an embodiment, the text-recognition module combines multiple text-recognition results, from multiple image frames of a video of a document, to improve the recognition quality of values of text fields in the video. This method can be particularly advantageous when the document exhibits strong projective distortions and/or the video was taken under low lighting conditions. In an embodiment, the multiple text-recognition results were weighted using a focus score. An evaluation of this embodiment, using both full-string weighting and per-character weighting, was performed on the open video MIDV-2019 dataset.

This evaluation showed that, if only the full string was used for weighting, then the combination result does not significantly improve for video clips with projective distortions. However, the full-string weighting still produces an increase in the accuracy of the final recognition result for video clips captured under low lighting conditions.

On the other hand, when the combination algorithm for text recognition was modified to introduce per-character weighting, the accuracy of the final recognition result increases for both video clips with projective distortions and video clips with low lighting conditions. In an embodiment, the weights for each character are calculated using the same method by which the weights for full strings were calculated. Thus, the per-character modification did not increase the computational complexity of the combination algorithm.

Accordingly, the disclosed embodiments of the text-recognition module represent an improved weighting strategy for combining per-frame recognition results. In particular, the disclosed per-character weighting strategy reduces the error level of the combined results for videos with projective distortions and low lighting conditions, without increasing the computational complexity.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor to:
   receive a plurality of image frames from a video of a document;
   for each of the plurality of image frames,
      perform text recognition on the image frame to obtain a text-recognition result for the image frame, wherein the text-recognition result comprises a plurality of character-recognition results, wherein each character-recognition result represents a character in a text field in the document, and
      calculate a frame weight for the image frame; and
   combine the text-recognition results for at least a subset of the plurality of image frames by
      aligning the character-recognition results across the text-recognition results for the at least a subset of the plurality of image frames into an alignment with a plurality of positions, wherein each of the plurality of positions represents a position of a character in the text field in the document,
      calculating a character weight for each character-recognition result in the text-recognition results for the at least a subset of the plurality of image frames, and,
      at each of the plurality of positions in the alignment, accumulating the character-recognition results that are at that position, across the text-recognition results for the at least a subset of the plurality of image frames, based on the character weights and the frame weights, to produce an accumulated text-recognition result that represents the text field in the document.

2. The method of claim 1, wherein the at least a subset of the plurality of image frames consists of only a portion of the plurality of image frames.

3. The method of claim 2, wherein the portion consists of no more than a top half of the plurality of image frames having highest frame weights.

4. The method of claim 1, wherein the at least a subset of the plurality of image frames comprises all of the plurality of image frames.

5. The method of claim 1, wherein the frame weight for each image frame comprises an estimate of focus for that image frame.

6. The method of claim 5, wherein the character weight for each character-recognition result comprises an estimate of focus for image data of the character represented by that character-recognition result.

7. The method of claim 1, wherein the frame weight for each image frame comprises a minimum estimation value across the character-recognition results in the text-recognition result for that image frame.

8. The method of claim 1, wherein accumulating the character-recognition results that are at each position comprises iterating through each of the character-recognition results at that position, wherein each iteration comprises combining a current character-recognition result with an accumulated character-recognition result.

9. The method of claim 8, wherein combining a current character-recognition result with an accumulated character-recognition result comprises:
   when neither the current character-recognition result nor the accumulated character-recognition result represents an empty character, combining the current character-recognition result with the accumulated character-recognition result, based on a weight calculated for the accumulated character-recognition result and the character weight for the current character-recognition result;
   when the current character-recognition result represents an empty character, combining the current character-recognition result with the accumulated character-recognition result, based on the weight calculated for the accumulated character-recognition result and a weight calculated for the text-recognition result that comprises the current character-recognition result; and,
   when the accumulated character-recognition result represents an empty character, combining the current character-recognition result with the accumulated character-recognition result, based on a sum of weights calculated for the text-recognition results that comprise all previously considered character-recognition results and the character weight for the current character-recognition result.

10. The method of claim 9, wherein the weights calculated for the text-recognition results comprise an estimate of focus for image data of the text field in the document.

11. The method of claim 1, further comprising deriving a character string based on the accumulated text-recognition result.

12. The method of claim 11, further comprising using the character string in at least one query.

13. The method of claim 12, wherein the document is an identity document, wherein the character string represents identity data, and wherein the method comprises using the character string in at least one query to verify or record the identity data.

14. A method comprising using at least one hardware processor to:
   receive a plurality of image frames from a video of a document
   for each of the plurality of image frames,
      perform text recognition on the image frame to obtain a text-recognition result for the image frame, wherein the text-recognition result comprises a plurality of character-recognition results, wherein each character-recognition result represents a character in a text field in the document, and calculate a frame weight for the image frame, wherein the frame weight for each image frame comprises an estimate of focus for that image frame; and combine the text-recognition results for at least a subset of the plurality of image frames by aligning the character-recognition results across the text-recognition results for the at least a subset of the plurality of image frames into an alignment with a plurality of positions, wherein each of the plurality of positions represents a position of a character in the text field in the document, calculating a character weight for each character-recognition result in the text-recognition results for the at least a subset of the plurality of image frames, wherein the character weight for each character-recognition result comprises an estimate of focus for image data of the character represented by that character-recognition result, and, at each of the plurality of positions in the alignment, accumulating the character-recognition results that are at that position, across the text-recognition results for the at least a subset of the plurality of image frames, based on the character weights and the frame weights, to produce an accumulated text-recognition result that represents the text field in the document, wherein each frame weight and each character weight are calculated using a same focus estimation algorithm.

15. A method comprising using at least one hardware processor to:

receive a plurality of image frames from a video of a document for each of the plurality of image frames, perform text recognition on the image frame to obtain a text-recognition result for the image frame, wherein the text-recognition result comprises a plurality of character-recognition results, wherein each character-recognition result represents a character in a text field in the document, and calculate a frame weight for the image frame, wherein the frame weight for each image frame comprise an estimate of focus for that image frame; and combine the text-recognition results for at least a subset of the plurality of image frames by aligning the character-recognition results across the text-recognition results for the at least a subset of the plurality of image frames into an alignment with a plurality of positions, wherein each of the plurality of positions represents a position of a character in the text field in the document, calculating a character weight for each character-recognition result in the text-recognition results for the at least a subset of the plurality of image frames, wherein the character weight for each character-recognition result comprises an estimate of focus for image data of the character represented by that character-recognition result, and, at each of the plurality of positions in the alignment, accumulating the character-recognition results that are at that position, across the text-recognition results for the at least a subset of the plurality of image frames, based on the character weights and the frame weights, to produce an accumulated text-recognition result that represents the text field in the document, wherein accumulating the character-recognition results that are at each position comprises iterating through each of the character-recognition results at that position, wherein each iteration comprises combining a current character-recognition result with an accumulated character-recognition result, and wherein combining a current character-recognition result with an accumulated character-recognition result comprises when neither the current character-recognition result nor the accumulated character-recognition result represents an empty character, combining the current character-recognition result with the accumulated character-recognition result, based on a weight calculated for the accumulated character-recognition result and the character weight for the current character-recognition result, when the current character-recognition result represents an empty character, combining the current character-recognition result with the accumulated character-recognition result, based on the weight calculated for the accumulated character-recognition result and a weight calculated for the text-recognition result that comprises the current character-recognition result, and, when the accumulated character-recognition result represents an empty character, combining the current character-recognition result with the accumulated character-recognition result, based on a sum of weights calculated for the text-recognition results that comprise all previously considered character-recognition results and the character weight for the current character-recognition result, wherein the weights calculated for the text-recognition results comprise an estimate of focus for image data of the text field in the document, and wherein each frame weight, each character weight, and each of the weights calculated for the text-recognition results are calculated using a same focus estimation algorithm.

16. A system comprising:

at least one hardware processor; and one or more software modules that are configured to, when executed by the at least one hardware processor, receive a plurality of image frames from a video of a document, for each of the plurality of image frames, perform text recognition on the image frame to obtain a text-recognition result for the image frame, wherein the text-recognition result comprises a plurality of character-recognition results, wherein each character-recognition result represents a character in a text field in the document, and calculate a frame weight for the image frame, and combine the text-recognition results for at least a subset of the plurality of image frames by aligning the character-recognition results across the text-recognition results for the at least a subset of the plurality of image frames into an alignment with a plurality of positions, wherein each of the plurality of positions represents a position of a character in the text field in the document, calculating a character weight for each character-recognition result in the text-recognition results for the at least a subset of the plurality of image frames, and, at each of the plurality of positions in the alignment, accumulating the character-recognition results that are at that position, across the text-recognition results for the at least a subset of the plurality of image frames, based on the character weights and the frame weights, to produce an accumulated text-recognition result that represents the text field in the document.

17. A non-transitory computer-readable medium having instructions stored therein, wherein the instructions, when executed by a processor, cause the processor to:
    receive a plurality of image frames from a video of a document;
    for each of the plurality of image frames,
        perform text recognition on the image frame to obtain a text-recognition result for the image frame, wherein the text-recognition result comprises a plurality of character-recognition results, wherein each character-recognition result represents a character in a text field in the document, and
        calculate a frame weight for the image frame; and
    combine the text-recognition results for at least a subset of the plurality of image frames by
        aligning the character-recognition results across the text-recognition results for the at least a subset of the plurality of image frames into an alignment with a plurality of positions, wherein each of the plurality of positions represents a position of a character in the text field in the document,
        calculating a character weight for each character-recognition result in the text-recognition results for the at least a subset of the plurality of image frames, and,
        at each of the plurality of positions in the alignment, accumulating the character-recognition results that are at that position, across the text-recognition results for the at least a subset of the plurality of image frames, based on the character weights and the frame weights, to produce an accumulated text-recognition result that represents the text field in the document.

* * * * *